(12) United States Patent
Flaxman (10) Patent No.: US 10,221,938 B2
(45) Date of Patent: Mar. 5, 2019

(54) APPARATUS FOR MANAGING FLUID FLOW IN A VEHICLE (71) Applicant: QINETIQ LIMITED, Farnborough (GB)

(72) Inventor: Robert John Bonner Flaxman, Guildford (GB)

(73) Assignee: QINETIQ LIMITED, Hampshire (GB)

( * ) Notice: Subject to any disclaimer, the term of this patent is extended or adjusted under 35 U.S.C. 154(b) by 0 days.

(21) Appl. No.: 15/310,744

(22) PCT Filed: May 22, 2015

(86) PCT No.: PCT/EP2015/061461
§ 371 (c)(1),
(2) Date: Nov. 11, 2016

(87) PCT Pub. No.: WO2015/177362
PCT Pub. Date: Nov. 26, 2015

(65) Prior Publication Data
US 2017/0097087 A1    Apr. 6, 2017

(30) Foreign Application Priority Data
May 23, 2014   (GB) .................................. 1409180.5

(51) Int. Cl.
*F16H 57/04* (2010.01)
*F16H 48/10* (2012.01)

(52) U.S. Cl.
CPC ......... *F16H 57/0435* (2013.01); *F16H 48/10* (2013.01); *F16H 57/0412* (2013.01); *F16H 57/0439* (2013.01); *F16H 57/0483* (2013.01)

(58) Field of Classification Search
None
See application file for complete search history.

(56) References Cited

U.S. PATENT DOCUMENTS 5,415,603 A * 5/1995 Tuzuki .................... B60K 6/26
                                                            477/138
5,417,298 A * 5/1995 Shibahata .............. B60K 23/04
                                                            180/233

(Continued)

FOREIGN PATENT DOCUMENTS

| EP | 2282083 A1 | 2/2011 |
| WO | 2010125648 A1 | 11/2010 |
| WO | 2014206597 A1 | 12/2014 |

OTHER PUBLICATIONS

International Search Report and Written Opinion of the International Searching Authority issued in International Application No. PCT/EP2015/061461.

*Primary Examiner* — Justin Holmes
(74) *Attorney, Agent, or Firm* — Kenealy Vaidya LLP (57) ABSTRACT

Some embodiments are directed to an apparatus for managing fluid flow in a vehicle, that includes an epicyclic gear set having first, and second inputs configured to receive rotational drive input from a torque output feature of a powertrain and a rotary actuator respectively. A pump driver is provided for driving a fluid pump, the pump driver being configured to receive rotational drive input from an output of the epicyclic gear set. A controller is configured to determine information corresponding to the rotational speed of the torque output feature using information generated by a rotational speed sensor and based on this control the rotary actuator, such that the pump driver is caused to rotate at substantially a pre-specified speed.

10 Claims, 5 Drawing Sheets

(56) References Cited

U.S. PATENT DOCUMENTS

| | | | | |
|---|---|---|---|---|
| 5,662,188 A | * | 9/1997 | Ito | .......................... B62D 5/07 |
| | | | | 184/11.1 |
| 5,823,282 A | | 10/1998 | Yamaguchi | |
| 2007/0107961 A1 | * | 5/2007 | Iwanaka | ................ B60K 6/365 |
| | | | | 180/65.6 |
| 2008/0056912 A1 | * | 3/2008 | Pizzichil | ................... F04B 9/02 |
| | | | | 417/223 |
| 2013/0075198 A1 | * | 3/2013 | Uusitalo | ............. F16H 57/0434 |
| | | | | 184/6.12 |

* cited by examiner

APPARATUS FOR MANAGING FLUID FLOW IN A VEHICLE

CROSS REFERENCE TO RELATED APPLICATION(S)

This application is a National Phase filing under 35 C.F.R. § 371 of and claims priority to PCT Patent Application No.: PCT/EP2015/061461, filed on May 22, 2015, which claims the priority benefit under 35 U.S.C. § 119 of British Application No.: 1409180.5, filed on May 23, 2014, the contents of which are hereby incorporated in their entireties by reference.

GOVERNMENT LICENSE RIGHTS

The present inventions were made with government support under Contract Number #W56HZV-11-C-0001 awarded by BAE Systems Land & Armaments L.P. The government has certain rights in the invention.

FIELD

The present invention concerns apparatus for managing fluid flow in a vehicle, such as transmission fluid.

BACKGROUND

In some vehicle transmissions, transmission fluid flows at a speed proportional to that of the vehicle. If a pump arrangement in such vehicles is configured to cause transmission fluid to flow at a suitable rate when travelling slowly then at high vehicle travelling speed an excessive flow of transmission fluid will arise which reduces overall transmission efficiency. Pump arrangements like this require a complex arrangement of fluid flow features (e.g. non-return valves) in order to function when the vehicle travels in reverse. In particular fluid flow features are required to redirect the flow of transmission fluid such that it travels through a transmission fluid distribution system in the same direction regardless of the direction in which the vehicle is travelling.

Aspects of the present invention are conceived to address the foregoing.

SUMMARY

According to an aspect of the present invention there is provided apparatus for managing fluid flow in a vehicle, comprising: an epicyclic gear set having first and second inputs configured to receive rotational drive input from a torque output feature of a powertrain and a rotary actuator respectively; a pump driver for driving a fluid pump, the pump driver configured to receive rotational drive input from an output of the epicyclic gear set; and a controller configured to determine information corresponding to the rotational speed of the torque output feature using information generated by a rotational speed sensor and based on this control the rotary actuator such that the pump driver is caused to rotate at substantially a pre-specified speed.

The torque output feature may be rotationally fixed to a transmission output shaft and the information corresponding to the rotational speed of the torque output feature may be indicative of the rotational speed of the transmission output shaft; or alternatively the torque output feature may be rotationally fixed to a differential cross-shaft and the information corresponding to the rotational speed of the torque output feature may be indicative of the rotational speed of the differential cross-shaft.

The controller may be configured to compare the rotational speed of the transmission output shaft or differential cross-shaft with a lookup table associating different values thereof with respective entries of information indicative of how the rotary actuator should be controlled in order for the pump driver to rotate at substantially a pre-specified speed.

The controller may be configured to determine the rotational speed of the first input of the epicyclic gear set and then use this to determine how the rotary actuator should be controlled in order for the pump driver to rotate at substantially a pre-specified speed.

The controller may be configured to compare the determined rotational speed of the first input of the epicyclic gear set with a lookup table which associates different values thereof with respective entries of information indicative of how the rotary actuator should be controlled in order for the pump driver to rotate at substantially a pre-specified speed.

The first input of the epicyclic gear set may be one of a planet gear carrier, a sun gear and a ring gear; the second input of the epicyclic gear set may be another of the planet gear carrier, the sun gear and the ring gear; and the output of the epicyclic gear set may be the remaining of the planet gear carrier, the sun gear and the ring gear.

The first input of the epicyclic gear set may be the planet gear carrier; the second input of the epicyclic gear set may be the sun gear; and the output of the epicyclic gear set may be the ring gear.

According to another aspect of the present invention there is provided apparatus for managing fluid flow in a vehicle, comprising: an epicyclic gear set having first and second inputs configured to receive rotational drive input from a torque output feature of a powertrain and a rotary actuator respectively; a pump driver for driving a fluid pump, the pump driver configured to receive rotational drive input from an output of the epicyclic gear set; a temperature sensor for generating output indicative of the temperature of fluid driven by the fluid pump; and a controller configured to receive the output generated by the temperature sensor and based on this control the rotary actuator such that the pump driver is caused to rotate at a speed such that the temperature of the fluid driven by the fluid pump is substantially maintained in accordance with a pre-specified condition.

The controller may be configured such that if the temperature of the fluid driven by the fluid pump is determined to be not in accordance with the pre-specified condition, the controller determines a target rotational speed at which the pump driver should spin at in order for the fluid driven by the fluid pump to flow at such a rate that its temperature will change and thereby be brought back into accordance with the pre-specified condition.

The controller may be configured to control the rotary actuator such that the pump driver increases in rotational speed if the temperature of the fluid driven by the fluid pump is determined to be too hot, whereas the controller may be configured to control the rotary actuator such that the pump driver decreases in rotational speed if the temperature of the fluid driven by the fluid pump is determined to be too cool.

The torque output feature of the powertrain may be rotationally fixed to either a transmission output shaft or a differential cross-shaft.

The first input of the epicyclic gear set may be one of a planet gear carrier, a sun gear and a ring gear; the second input of the epicyclic gear set may be another of the planet gear carrier, the sun gear and the ring gear; and the output of the epicyclic gear set may be the remaining of the planet gear carrier, the sun gear and the ring gear.

The first input of the epicyclic gear set may be the planet gear carrier; the second input of the epicyclic gear set may be the sun gear; and the output of the epicyclic gear set may be the ring gear.

According to a further aspect of the present invention there is provided a vehicle comprising apparatus according to any of the heretofore mentioned arrangements for managing fluid flow in the vehicle, wherein the fluid managed is optionally transmission fluid.

BRIEF DESCRIPTION OF THE DRAWINGS

Embodiments of the invention will now be described by way of non-limiting example with reference to the accompanying drawings, in which.

DETAILED DESCRIPTION

Embodiments of the present invention are described hereafter in the context of a tracked vehicle, specifically a method of managing the flow rate of transmission fluid inside a tracked vehicle. However this is not intended to be limiting and embodiments of the present invention could equally be used in other contexts such as managing the flow rate of any other type of fluid inside a vehicle, whether land based or not (e.g. a car, truck, lorry, van, motorcycle, snow mobile, boat, jet ski or aircraft).

Figure 1:
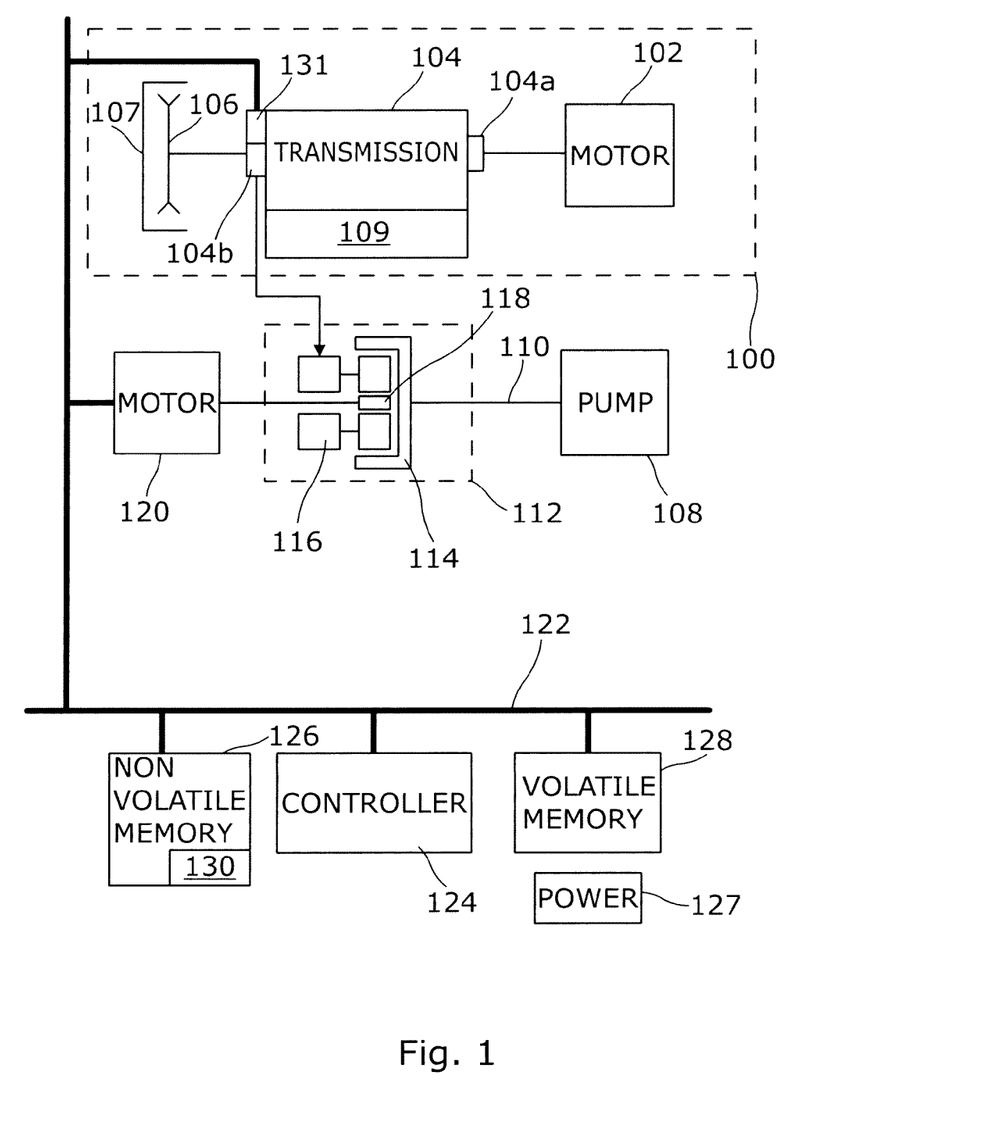
FIG. 1 is a schematic illustration of some components on board a vehicle.

With the above proviso in mind, FIG. 1 shows a power train too of a tracked vehicle in which torque is provided to a continuous track 107 for propelling the vehicle. Although not illustrated, a similar arrangement for providing torque to another continuous track on the other side of the vehicle is provided.

The power train too includes a first electric motor 102 for generating torque. In use, some of this torque is transferred through a transmission 104 to a vehicle drive sprocket 106 for driving the continuous track 107. The transmission 104 has an input shaft 104a and an output shaft 104b, whereby the ratio of the rotational speeds of these two shafts depends on the selected transmission gear ratio. Some of the torque output from the transmission 104 is transferred to a lubrication pump 108 for causing the pump 108 to urge transmission fluid around a transmission fluid distribution system 109 of the transmission 104.

A pump drive shaft 110 is arranged to receive torque output from the transmission 104 via an epicyclic gear set 112, whereby the epicyclic gear set 112 includes a ring gear 114, a planet carrier 116 and a sun gear 118.

Various types of pump 108 could be used such as a rotary vane pump, whereby rotation of the pump drive shaft no causes vanes inside the pump 108 to rotate for drawing transmission fluid into and subsequently forcing it out of the pump. Alternatively the pump 108 could be of the gerotor variety, whereby rotation of the pump drive shaft no causes rotors inside the pump 108 to rotate for drawing transmission fluid into and subsequently forcing it out of the pump 108.

Persons familiar with epicyclic gear sets will appreciate that the rotational speeds of the respective parts of an epicyclic gear set (i.e. the ring gear 114, planet carrier 116 and sun gear 118) are related to each other. In particular they will understand the mathematical relationship between these rotational speeds.

In FIG. 1 the planet carrier 116 is arranged to receive some torque from the output shaft 104b of the transmission 104 when the tracked vehicle is propelled. This could be achieved by rotationally fixing a gear to the output shaft 104b and meshing it with the planet carrier 116. However the specific manner in which torque from the output shaft 104b is transferred to the planet carrier 116 is not essential because various other ways of achieving this could be used. For instance a plurality of gears in mesh with one another could be used to transfer some torque from the transmission output shaft 104b to the planet carrier 116.

Figure 5:
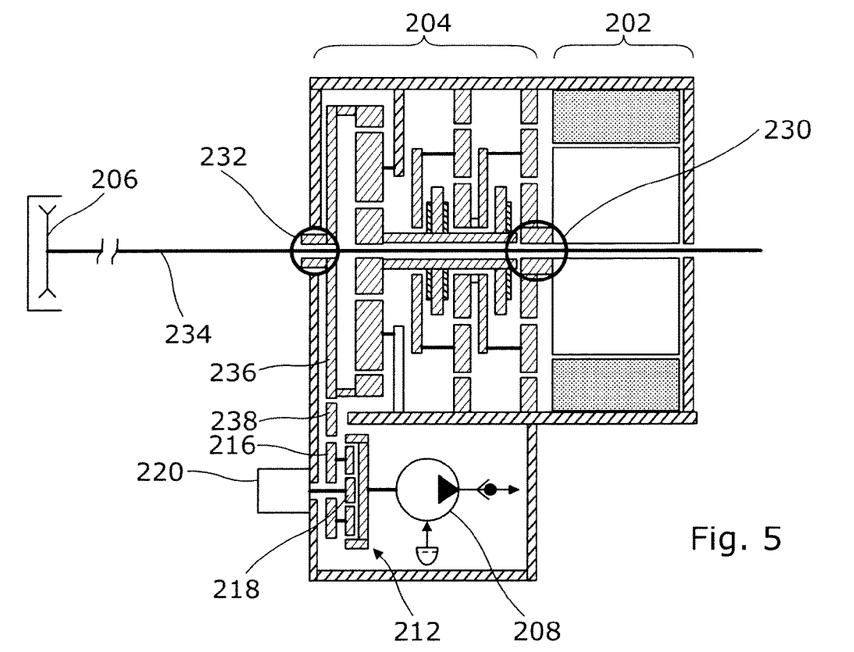
FIG. 5 is a schematic illustration of some features depicted in FIG. 1 shown in more detail.

A specific example is depicted in FIG. 5 in which the transmission 204 includes an input part 230 which rotates when torque is exerted thereon by a first electric motor 202. Such torque can be stepped through one or more epicyclic gear sets inside the transmission 204 to a transmission output part 232, whereby the transmission output part 232 is fixed to an output linkage 234 through which torque is transferred between the transmission section 204 and the vehicle drive sprocket 206. The planet carrier 216 of the epicyclic gear set 212 is arranged to receive torque from a ring gear 236 forming part of the transmission 204 via an idler gear 238 (although the use of an idler gear is optional). The ring gear 236 is configured to rotate whatever gear ratio is selected within the transmission 204. Thus when the first electric motor 202 generates torque for propelling the vehicle the planet carrier 216 will receive some of that torque and the pump 208 will be caused to urge transmission fluid around a transmission fluid distribution system. Controlling the rotational speed and direction of the sun gear 218 using a second electric motor 220 enables the flow rate at which the pump 208 drives transmission fluid to be controlled.

Referring back to FIG. 1, since the pump drive shaft 110 is fixed to the ring gear 114 then rotatably driving the planet carrier 116 will cause rotation of the drive shaft no. This will in turn cause the pump 108 to urge transmission fluid around the aforementioned transmission fluid distribution system 109.

If the sun gear 118 of the epicyclic gear set 112 is held stationary by the second electric motor 120 providing a holding torque then the rotational speed of the ring gear 114 will be proportional to that of the planet carrier 116. Thus the faster the rotational speed of the transmission output shaft 104b, the faster the tracked vehicle will travel and the faster the rotational speed of the pump drive shaft no will be. In another manner of speaking if the sun gear 118 of the epicyclic gear set 112 is held stationary by a holding torque from the second electric motor 120 the rate of flow of transmission fluid will be proportional to the driving speed of the vehicle.

However it is possible to substantially maintain a pre-specified flow rate of transmission fluid across a range of vehicle travelling speeds because the sun gear 118 is arranged to be rotably driven by the second electric motor 120. Persons familiar with epicyclic gear sets will appreciate that to increase the rotational speed of the ring gear 114 when the vehicle is travelling, the sun gear 118 should be rotated in an opposite direction to the planet carrier 116. In contrast to reduce the rotational speed of the ring gear 114 the sun gear 118 should be rotated in the same direction as the planet carrier 116.

Thus for a given rotational speed and direction of the planet carrier 116, controlling the rotational speed and direction of the sun gear 118 enables the rotational speed and direction of the ring gear 114, and thus the pump drive shaft 110 to be controlled.

How the second electric motor 120 is controlled to maintain a pre-specified flow rate of transmission fluid across a range of different vehicle speeds will now be described.

The aforementioned vehicle includes a variety of electronic components coupled together by a system bus 122 that is used to transfer signals (e.g. raw data and control signals) between such components, one of which is a controller 124. Non-volatile memory 126 and volatile memory 128 are also coupled to the system bus 122, wherein the controller 124 is configured to execute program code stored in the non-volatile memory 126 and to use the volatile memory 128 to store intermediate results.

The controller 124 may take any suitable form, for instance it may be a microcontroller, plural microcontrollers, a processor, or plural processors. Furthermore the non-volatile memory 126 could comprise ROM such as PROM, EPROM or EEPROM and the volatile memory 128 could comprise RAM such as DRAM or SRAM.

A flow rate management application 130 is stored in the non-volatile memory 126. The controller 124 is configured to load this application into the volatile memory 128 and subsequently implement the functionality defined by it. Upon doing so the controller 124 interacts with electronic components coupled to the system bus 122 to manage the flow rate of transmission fluid. The functionality which the flow rate management application 130 causes the controller 124 to implement when executed is described below however the nature of two other components is outlined first.

A rotational speed sensor 131 in communication with the system bus 122 is provided to generate output indicative of the rotational speed of the transmission output shaft 104$b$, whereby the rotational speed sensor 131 may comprise a resolver (or other suitable speed sensing element). In some embodiments output generated by the rotational speed sensor 131 contains information corresponding to the rotational position of the transmission output shaft 104$b$ and the controller 124 determines the rotational speed thereof based on this output. However in other embodiments the first rotational speed sensor 131 itself has some processing capability which enables it to perform a similar determination, such that the information output from this sensor 131 to the controller 124 is indicative of the determined rotational speed of the transmission output shaft 104$b$.

A power supply source 127 (for example a battery) is also provided for powering the various electronic components of the vehicle.

Figure 2:
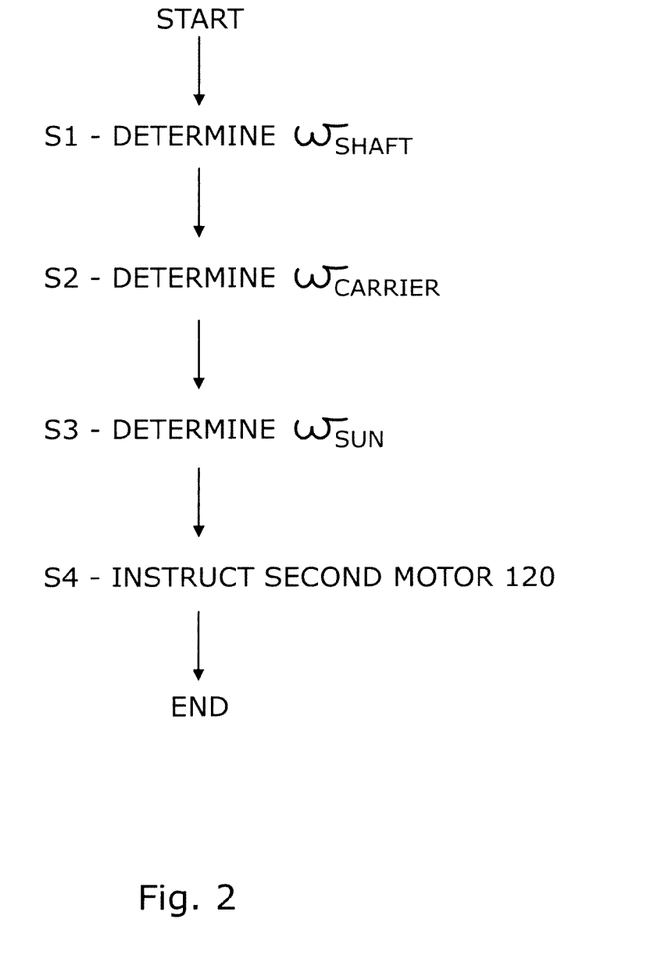
FIG. 2 is a method of managing the flow rate of transmission fluid.

Now the functionality which the fluid flow management application 130 causes the controller 124 to implement when executed will be described with particular reference to FIG. 2.

In step S1 the controller 124 determines the rotational speed $\omega_{SHAFT}$ of the transmission output shaft 104$b$ based on information received from the rotational speed sensor 131.

In step S2 the controller 124 determines the rotational speed $\omega_{CARRIER}$ of the planet carrier 116. In some embodiments the ratio of rotational speeds of the transmission output shaft 104$b$ and the planet carrier 116 is 1:1 such that $\omega_{SHAFT}=\omega_{CARRIER}$. However in other embodiments this ratio may not be 1:1 and in such embodiments the controller 124 can calculate $\omega_{CARRIER}$ by using the value of $\omega_{SHAFT}$ determined in step S1 and information pre-stored in the non-volatile memory 126 concerning the ratio between the rotational speeds of the transmission output shaft 104$b$ and the planet carrier 116.

In step S3 the controller 124 determines the rotational speed $\omega_{SUN}$ of the sun gear 118 necessary for the pump 108 to urge transmission fluid through the transmission fluid distribution system 109 at a pre-specified flow rate.

Step S3 could be implemented by comparing $\omega_{CARRIER}$ with a lookup table stored in non-volatile memory 126 which associates different values of $\omega_{CARRIER}$ with respective values of $\omega_{SUN}$ necessary for the pump 108 to urge transmission fluid through the transmission fluid distribution system 109 at the pre-specified flow rate.

Alternatively the controller 124 could calculate $\omega_{SUN}$ using a pre-stored target value of $\omega_{RING}$ (stored in non-volatile memory 126) and the determined value of $\omega_{CARRIER}$. The quantitative relationship between the rotational speeds of the respective parts of an epicyclic gear set (i.e. the ring gear 114, planet carrier 116 and sun gear 118) is well known. Persons familiar with epicyclic gear sets will thus understand how the controller 124 could determine the value of $\omega_{SUN}$ from a pre-stored target value of $\omega_{RING}$ and the determined value of $\omega_{CARRIER}$. For completeness it is also mentioned that persons skilled in the art will know that along with epicyclic gear rotational speed relationships there are also epicyclic power relationships and torque relationships that need to be conserved. The epicyclic gear set 112 has to maintain a torque balance and a power balance whereas the torque and power into the epicyclic gear set 112 has to balance the torque and power out of the epicyclic gearset 112.

Regardless of how $\omega_{SUN}$ is determined, it will be appreciated that it could be positive or negative depending on whether the rotational speed of the ring gear 114 is to be increased or decreased to maintain the pre-specified flow rate of transmission fluid.

In step S4 the controller 124 instructs the second electric motor 120 to drive the sun gear 118 at the determined rotational speed $\omega_{SUN}$. This causes the pump drive shaft 110 to be driven by the ring gear 114 at the target rotational speed $\omega_{RING}$ so that transmission fluid is urged by the pump 108 through the transmission fluid distribution system 109 at the pre-specified flow rate.

Furthermore, continuing with a discussion of the method described in connection with FIG. 2, it is also envisaged that in some embodiments $\omega_{SUN}$ could be determined by comparing $\omega_{SHAFT}$ with a lookup table stored in non-volatile memory 126 which associates different values thereof with respective values of $\omega_{SUN}$ necessary for the pump 108 to urge transmission fluid through the transmission fluid distribution system 109 at the pre-specified flow rate. In such embodiments step S2 need not be implemented.

By substantially maintaining the flow rate of transmission fluid at a pre-specified value, in addition to maintaining the direction of such flow, the efficiency of the transmission 104 can be increased since the transmission fluid flow can be controlled to what is required.

As already mentioned, to increase the rotational speed of the ring gear 114 when the vehicle is travelling slowly the sun gear 118 should be rotated in an opposite direction to the planet carrier 116. In this condition, both the transmission output shaft 104$b$ and the second electric motor 120 will be providing power to the pump 108. In contrast, to reduce the rotational speed of the ring gear 114 when the vehicle is travelling quickly the sun gear 118 should be rotated in the same direction as the planet carrier 116. Since the torque balance between the sun, ring and carrier is always maintained, when the second electric motor 120 is rotated in the same direction as the planet carrier 116 it will be acting as a generator and thus will provide power back to the system circuitry to supplement power drawn from the power source 127. Under this condition the planet carrier 116 (coupled to the transmission output shaft 104b) will provide power to both the pump 108 and the regenerating second electric motor 120.

It should be noted that even when the tracked vehicle described in the foregoing example is travelling in reverse, the second electric motor 120 can be controlled so that transmission fluid is pumped at the pre-specified flow rate in the same direction as when the vehicle is travelling forwards. More specifically even if the planet carrier 116 is urged in a backwards rotational direction, due to the vehicle travelling in reverse, movement of the sun gear 118 can be controlled by the second electric motor 120 such that the ring gear 114 rotates in the required direction at the required speed for causing the pump 108 to drive transmission fluid around the transmission fluid distribution system 109 at the pre-specified flow rate in the same direction as when the vehicle is travelling forwards. This provides that fluid flow features for accommodating a backwards driving force on the transmission fluid (e.g. non-return valves) are not required, which reduces the complexity of the transmission fluid distribution system 109 and thereby decreases its size and weight. As a result overall vehicle weight is reduced and on-board vehicle space is increased.

Another method of managing the flow rate of transmission fluid is envisaged, in which transmission fluid is caused to flow at a rate dependant on the temperature thereof. Some embodiments thus include at least one temperature sensor at a suitable location for measuring the temperature of transmission fluid as it flows through the transmission fluid distribution system 109.

Figure 3:
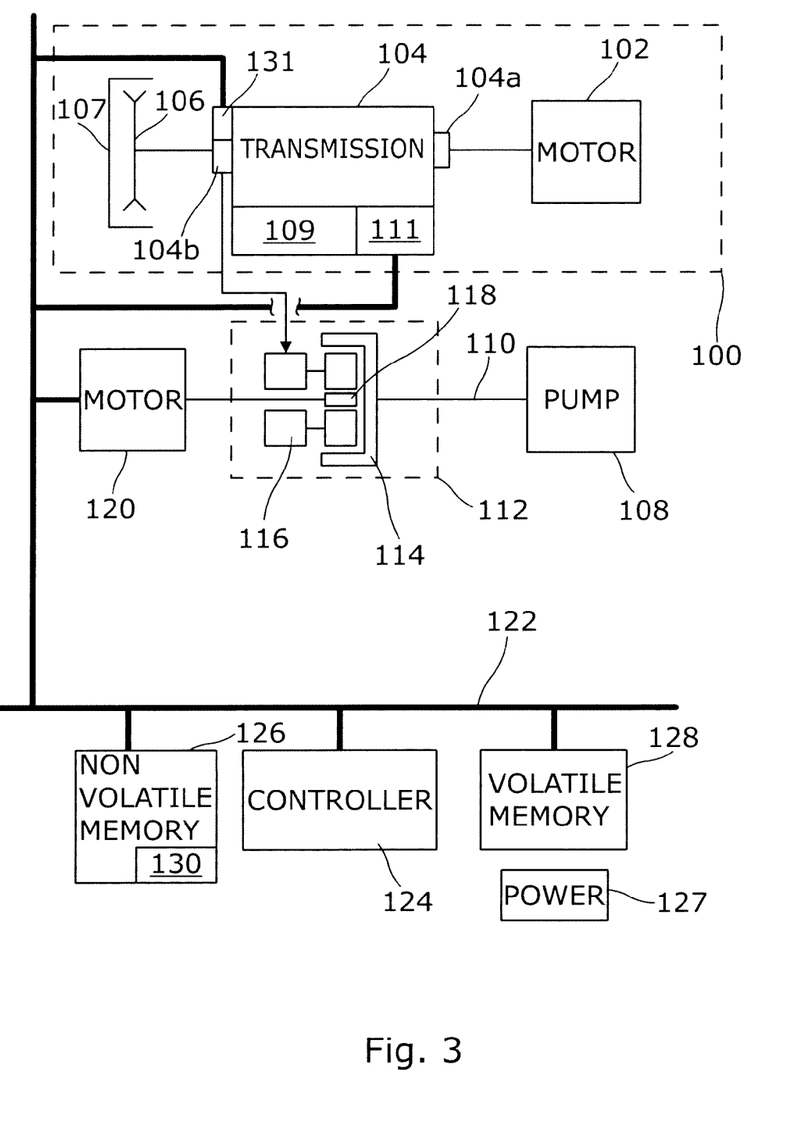
FIG. 3 is a schematic illustration of some components on board another vehicle.

The arrangement depicted in FIG. 3 is identical to that in FIG. 1 but additionally shows a temperature sensor 111 coupled to the system bus 122 for this purpose. If transmission fluid is determined to become too hot then its rate of flow could be increased, whereas if it becomes too cool then its rate of flow could be decreased. How this can be achieved in practice is now described with reference to FIG. 4, whereby the steps shown are implemented when the controller 124 executes an alternative version of the fluid flow management application 130.

Figure 4:
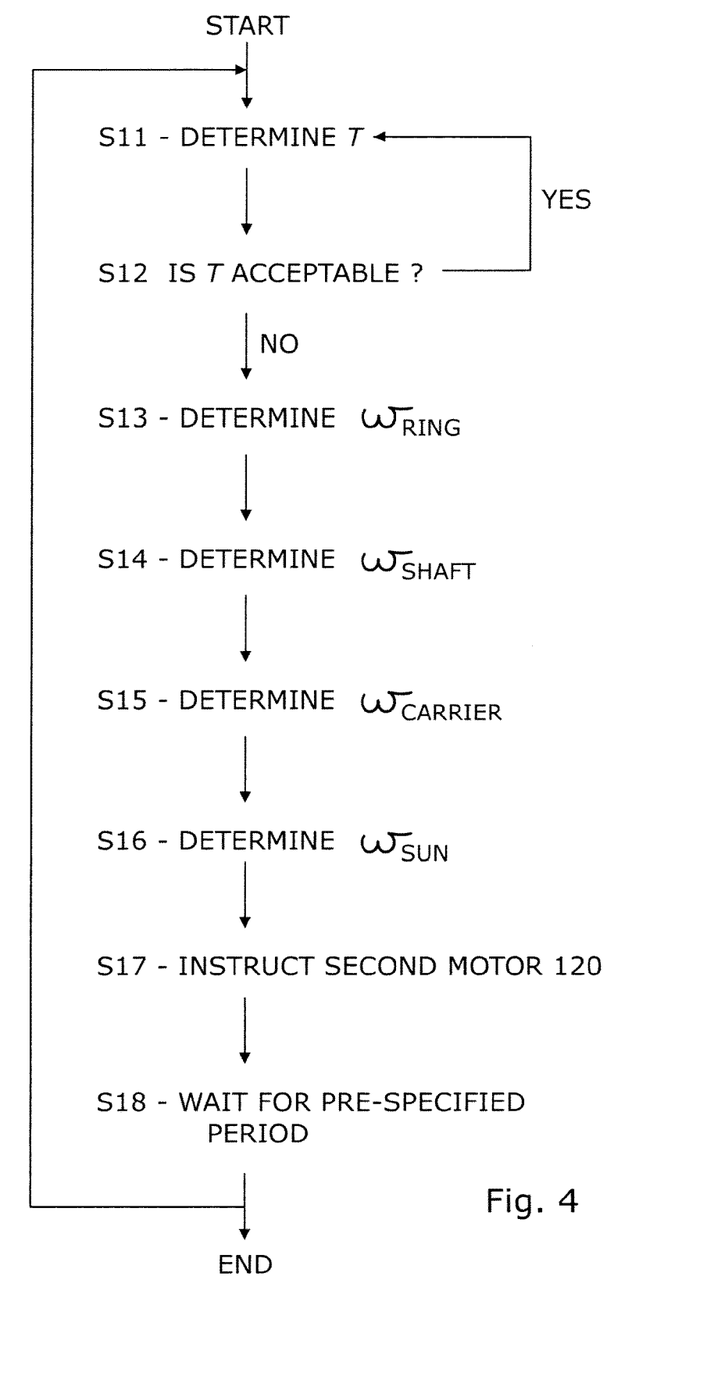
FIG. 4 is another method of managing the flow rate of transmission fluid.

In step S11 the controller 124 determines the temperature of transmission fluid T based on output from the temperature sensor 111.

In step S12 the controller 124 determines if this temperature T falls inside a range of acceptable temperatures pre-stored in the non-volatile memory 126. If yes then steps S11 and S12 are repeated, whereas if no then the controller 124 implements step S13.

In step S13 the controller 124 determines a target rotational speed $\omega_{RING}$ of the ring gear 114 which would result in the pump 108 urging transmission fluid through the transmission fluid distribution system 109 at such a rate that the temperature thereof will change and be brought inside the acceptable range of temperatures. If the measured temperature of transmission fluid T is determined in step S11 to exceed the pre-stored acceptable range of temperatures then the rotational speed of the ring gear 114 is required to be increased, whereas if the temperature of transmission fluid T is determined in step S11 to lie below the acceptable range of temperatures then the rotational speed of the ring gear 114 is required to be decreased.

In view of the above, the target rotational speed $\omega_{RING}$ of the ring gear 114 is related to the temperature T measured in step S11. In particular, during use for a measured value of T a required change in rotational speed of the ring gear 114 $\Delta\omega_{RING}$ is proportional to $\Delta T$ which is the difference between the temperature value measured in step S11 and either the upper or lower limit of the pre-stored acceptable range of temperatures; whichever the measured temperature T lies beyond. In other words $\Delta\omega_{RING}=k\Delta T$. The specific value of k used depends on the rate at which the temperature of transmission fluid is required to be changed in practice and suitable values will be apparent to persons skilled in the art.

Therefore in implementing step S13 if the measured value of T is above the upper limit of pre-stored acceptable temperatures, then by causing the ring gear 114 to increase in speed by $\Delta\omega_{RING}$ and thus spin at an increased target speed, transmission fluid will flow at such a rate that its temperature will gradually change and move inside the acceptable range of temperatures. In contrast if T is below the lower limit of the pre-stored acceptable range of temperatures, then by causing the ring gear 114 to decrease in speed by $\Delta\omega_{RING}$ and spin at a decreased target speed, transmission fluid will flow at such a rate that its temperature will gradually change and move inside the acceptable range of temperatures.

After having determined $\Delta\omega_{RING}$ and thus the new target value of $\omega_{RING}$ in step S13 the controller 124 determines in step S14 the rotational speed $\omega_{SHAFT}$ of the transmission output shaft 104b based on information received from the rotational speed sensor 131.

Next in step S15 the controller 124 determines the rotational speed $\omega_{CARRIER}$ of the planet carrier 116 in a corresponding manner to that already described in connection with step S2.

In step S16 the controller 124 determines the rotational speed $\omega_{SUN}$ of the sun gear 118 necessary for causing the ring gear 114 to spin at the target rotational speed determined in step S13. As already mentioned the quantitative relationship between the rotational speeds of the respective parts of an epicyclic gear set (i.e. the ring gear 114, planet carrier 116 and sun gear 118) is well known. Persons familiar with epicyclic gear sets will thus understand how the controller 124 can determine $\omega_{SUN}$ from $\omega_{RING}$ and $\omega_{CARRIER}$ determined in steps S13 and S15 and will also appreciate that $\omega_{SUN}$ could be positive or negative depending on whether the rotational speed of the ring gear 114 is to be increased or decreased with the aim of maintaining a pre-specified transmission fluid temperature.

In step S17 the controller 124 instructs the second electric motor 120 to drive the sun gear 118 at the calculated rotational speed $\omega_{SUN}$. This causes the pump drive shaft no to be driven by the ring gear 114 at the target rotational speed $\omega_{RING}$ determined in step S13 so that transmission fluid flows at a rate that will result in the temperature thereof changing such that it is gradually brought inside the acceptable range of temperatures stored in the non-volatile memory 126.

In step 18 the controller 124 waits for a pre-specified period of time (e.g. sixty seconds) before repeating the process in FIG. 4, in order for the temperature of transmission fluid to change due to being caused to flow at a different flow rate.

By maintaining the temperature of transmission fluid inside a predetermined range the efficiency of the transmission 104 can be increased.

It should be noted that even when the tracked vehicle described in the foregoing example is travelling in reverse, the second electric motor 120 can be controlled so that transmission fluid is pumped at the required flow rate in the same direction as when the vehicle is travelling forwards. More specifically even if the planet carrier 116 is urged in a backwards rotational direction, due to the vehicle travelling in reverse, movement of the sun gear 118 can be controlled by the second electric motor 120 such that the ring gear 114 rotates at the required speed, in the same direction as when the vehicle is travelling forwards. This provides that fluid flow features for accommodating a backwards driving force on the transmission fluid (e.g. non-return valves) are not required, which reduces the complexity of the transmission fluid distribution system 109 and thereby decreases its size and weight. As a result overall vehicle weight is reduced and on-board vehicle space is increased.

In any of the foregoing embodiments the maximum achievable power output of the second electric motor 120 could be less than that of the first electric motor 102. This is because for nominal (or median) and high travelling speeds, most of the power for driving the pump 108 is generated by the first electric motor 102 which is also used to drive the vehicle. Thus a smaller amount of power is required from the second electric motor 120 for optimising the rotational speed of the pump drive shaft no. At very low vehicle speeds, most of the power for the pump 108 will come from the second electric motor 102. In other words, the methods described above allow an optimisation of both rotational speed from a first electric motor 102 (such as a traction motor) and the precise control of a lower power second electric motor 120 (such as a permanent magnet motor), which will reduce pump parasitic losses and improve overall system efficiency.

Figure 6:
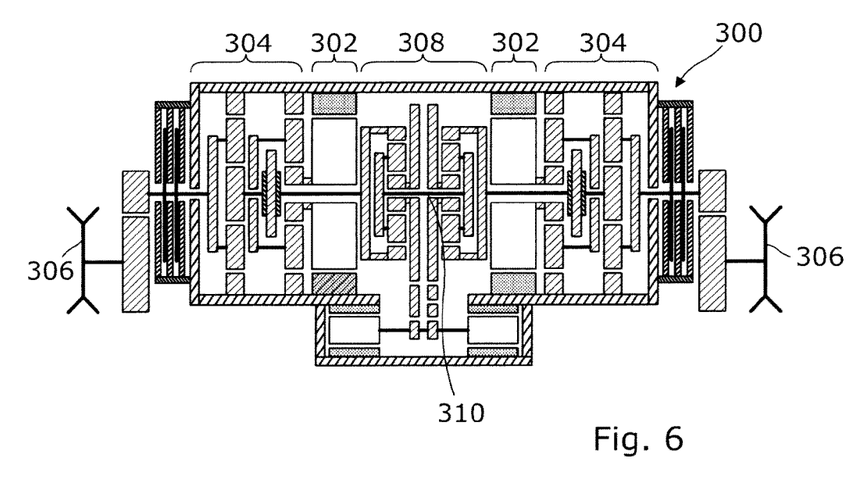
FIG. 6 is a schematic illustration of a known cross-drive power train.

Further embodiments are now described with reference to FIG. 6 which schematically illustrates a cross-drive power train 300 for driving continuous tracks on opposite sides of a tracked vehicle. Such an arrangement is described between page 11, line 17 and page 13, line 7 of WO2014/206597A1; the entire contents of this document being incorporated herein by reference. In summary however the power train 300 comprises two electric motors 302 for generating torque which is transferred to vehicle drive sprockets 306 via transmissions 304. The vehicle drive sprockets 306 are arranged to drive continuous vehicle tracks on opposite sides of the vehicle. A differential 308 is provided between the two electric motors 302, which includes a cross shaft 310 that spins when the vehicle is moving forwards (or backwards) and at least one of the electric motors 302 is rotating. In other words the differential cross shaft 310 spins when a vehicle is being propelled using the power train 300.

Rotation of the differential cross shaft 310 can thus be used to actuate a pump via an epicyclic gear set like in any of the previously described embodiments. In particular torque could be transferred from the differential cross shaft 310 to a planet carrier of an epicyclic gear set and with the additional torque from an electric pump drive motor (similarly to the aforementioned second motor 120) a pump drive shaft could be caused to rotate, whereby the pump drive shaft could be controlled to rotate at a particular rotational speed in accordance with any of the methods heretofore described; although the rotational speed of the cross-shaft will be utilised instead of that of a transmission output shaft to determine how the pump drive motor should be controlled. As a result, regardless of the vehicle travelling speed (and thus the cross shaft rotational speed) transmission fluid can be controlled to flow at a specific flow rate in a particular direction around a transmission fluid distribution system, even when the vehicle reverses. In embodiments where torque from a differential cross shaft is used to actuate a pump via an epicyclic gear set, only a single pump is required for driving transmission fluid through one or more transmissions. Having only a single sump and pump for urging transmission fluid around at least one transmission fluid distribution system reduces overall vehicle weight and increases on-board available space.

It will be appreciated that whilst various aspects and embodiments of the present invention have heretofore been described, the scope of the present invention is not limited to the embodiments set out herein and instead extends to encompass all other arrangements, and modifications and alterations thereto, falling within the spirit and scope of the appended claims.

For instance, whilst illustrative embodiments have been described as employing software it will be appreciated by persons skilled in the art that the functionality provided by such software may instead be provided by hardware (for example by one or more application specific integrated circuits), or indeed by a mix of hardware and software.

The use of a split power source with an epicyclic gear (i.e. two inputs power sources and one pump drive output) has been described here. In the example illustrated here the sun gear connects to the pump drive motor (input 2), the ring gear connects to the pump drive shaft (output) and the carrier connects via the transmission output (input 1). This could be rearranged to an alternative configuration to optimise packaging, efficiency and weight as required.

Referring to FIG. 1, in some embodiments the sun gear 118 need not necessarily be rotatably driven by the second electric motor 120. Also the planet carrier 116 need not necessarily receive torque from the power train too. Furthermore, the ring gear 114 need not necessarily be arranged to rotatably drive the pump drive shaft 110. In other words the sun gear 118 and planet carrier 116 need not necessarily function as inputs of the epicyclic gear set 112 that are arranged to receive rotational drive input. Also the ring gear 114 need not necessarily function as an output of the epicyclic gear set 112 for rotatably driving the pump drive shaft 110.

In particular a first input of the epicyclic gear set 112, arranged to receive rotational drive input from the power train too, could be either one of the planet carrier 116, the sun gear 118 and the ring gear 114. Also the second input of the epicyclic gear set, arranged to receive rotational drive input from the second electric motor 120, could be another one of the planet carrier 116, the sun gear 118 and the ring gear 114. Furthermore the output of the epicyclic gear set 112, arranged to rotatably drive the pump drive shaft no, could be the remaining of the planet gear carrier 116, the sun gear 118 and the ring gear 114.

One or both of the inputs of the epicyclic gear set 112 could be arranged to receive rotational drive input from respective sources thereof (e.g. from an electric motor) through various gear arrangements. For instance torque could be transferred to one or both of the inputs via one or more gears in mesh with one another. Similarly, the output of the epicyclic gear set 112 could be arranged to rotatably drive the pump drive shaft no via various gear arrangements instead of being fixed thereto. For instance torque could be transferred from the output to the pump drive shaft no via one or more gears in mesh with one another.

Since the quantitative relationship between the rotational speeds of the respective parts of an epicyclic gear set (i.e. the ring gear 114, planet carrier 116 and sun gear 118) is well known, persons familiar with epicyclic gear sets will be able to determine how the rotational speed of one of the epicyclic gear set inputs should be adjusted when a vehicle is being propelled such that the output spins at a required rotational speed in a particular direction.

Although the first and second motors 102, 120 have been described throughout as being electric motors, in some embodiments one or both of these could alternatively comprise any form of rotary actuator for example a hydraulic motor, pneumatic motor or an internal combustion engine.

Step S12 has been previously described as determining if a measured temperature value T falls inside a range of acceptable temperatures. However in other embodiments step S12 involves determining if the measured temperature value T differs from a target temperature value, whereby the method in FIG. 4 instead involves maintaining the temperature of transmission fluid at the target temperature value, rather than maintaining it within a range of acceptable temperature values.

When putting any of the foregoing arrangements into practice persons skilled in the art are free to configure such arrangements to include gear ratios necessary for fulfilling the required purpose of the relevant arrangement. For instance, the specific diameter of the planets in the epicyclic gear sets described herein is not essential, nor is the specific number of teeth thereon. The same goes for the sun gear, planet carrier and ring gear of the epicyclic gear sets described herein.

However, it is desirable that when the second electric motor 120 is offline enough transmission fluid is caused to flow when the vehicle in question is towed to avoid damage of the transmission 106. In such embodiments the second electric motor 120 may be configured such that it cannot be back driven at low towing speeds.

There are operating conditions where a vehicle must be towed with all electric power to the vehicle off. In some embodiments the nature of the transmission is such that the gears are always connected to the output sprockets therefore under towing conditions, some lubrication must still be provided to the transmission. Under these circumstances, the carrier 116 will still be driven by the transmission output 104b but the pump drive motor 102 will need only to provide a holding torque in order to drive the oil pump 108 via the ring gear 114.

The invention claimed is:

1. An apparatus for managing fluid flow in a vehicle, comprising:
an epicyclic gear set having first and second inputs configured to receive rotational drive input from a torque output feature of a powertrain and a rotary actuator respectively;
a pump driver for driving a fluid pump, the pump driver configured to receive rotational drive input from an output of the epicyclic gear set; and
a controller configured to receive information generated by a rotational speed sensor, determine rotational speed information corresponding to the rotational speed of the torque output feature from the received information and control the rotary actuator such that the pump driver is caused to rotate at substantially a pre-specified speed, wherein the torque output feature is rotationally fixed to a transmission output shaft and the information corresponding to the rotational speed of the torque output feature is indicative of the rotational speed of the transmission output shaft, or wherein the torque output feature is rotationally fixed to a differential cross-shaft and the information corresponding to the rotational speed of the torque output feature is indicative of the rotational speed of the differential cross-shaft, and
wherein the controller is configured to compare the rotational speed of the transmission output shaft or differential cross-shaft with a lookup table associating different values thereof with respective entries of information indicative of how the rotary actuator should be controlled in order for the pump driver to rotate at substantially a pre-specified speed.

2. The apparatus of claim 1, wherein the torque output feature is rotationally fixed to a transmission output shaft and the information corresponding to the rotational speed of the torque output feature is indicative of the rotational speed of the transmission output shaft.

3. The apparatus of claim 1 wherein the torque output feature is rotationally fixed to a differential cross-shaft and the information corresponding to the rotational speed of the torque output feature is indicative of the rotational speed of the differential cross-shaft.

4. The apparatus of claim 1, wherein
the first input of the epicyclic gear set is one of a planet gear carrier, a sun gear and a ring gear;
the second input of the epicyclic gear set is another of the planet gear carrier, the sun gear and the ring gear; and
the output of the epicyclic gear set is the remaining of the planet gear carrier, the sun gear and the ring gear.

5. The apparatus of claim 4, wherein:
the first input of the epicyclic gear set is the planet gear carrier;
the second input of the epicyclic gear set is the sun gear; and
the output of the epicyclic gear set is the ring gear.

6. An apparatus for managing fluid flow in a vehicle, comprising:
an epicyclic gear set having first and second inputs configured to receive rotational drive input from a torque output feature of a powertrain and a rotary actuator respectively;
a pump driver for driving a fluid pump, the pump driver configured to receive rotational drive input from an output of the epicyclic gear set;
a temperature sensor for generating output indicative of the temperature of fluid driven by the fluid pump; and
a controller configured to receive the output generated by the temperature sensor and control the speed of rotation of the rotary actuator such that the pump driver is caused to rotate at a speed such that the temperature of the fluid driven by the fluid pump determined from the output generated by the temperature sensor, is substantially maintained in accordance with a pre-specified condition,
wherein the torque output feature of the powertrain is rotationally fixed to either a transmission output shaft or a differential cross-shaft.

7. The apparatus of claim 6, wherein the controller is configured such that if the temperature of the fluid driven by the fluid pump is determined to be not in accordance with the pre-specified condition, the controller determines a target rotational speed at which the pump driver should spin at in order for the fluid driven by the fluid pump to flow at such a rate that its temperature will change and thereby be brought back into accordance with the pre-specified condition.

8. The apparatus of claim 6, wherein the controller is configured to control the rotary actuator such that the pump driver increases in rotational speed if the temperature of the fluid driven by the fluid pump is determined to exceed a pre-stored range of temperatures, whereas the controller is configured to control the rotary actuator such that the pump driver decreases in rotational speed if the temperature of the fluid driven by the fluid pump is determined to fall below the pre-stored range of temperatures.

9. The apparatus of claim 6, wherein:
the first input of the epicyclic gear set is one of a planet gear carrier, a sun gear and a ring gear;
the second input of the epicyclic gear set is another of the planet gear carrier, the sun gear and the ring gear; and
the output of the epicyclic gear set is the remaining of the planet gear carrier, the sun gear and the ring gear.

10. The apparatus of claim 9, wherein:
the first input of the epicyclic gear set is the planet gear carrier;
the second input of the epicyclic gear set is the sun gear; and
the output of the epicyclic gear set is the ring gear.

\* \* \* \* \*